Nov. 10, 1942.   A. R. THOMAS ET AL   2,301,232
REFRIGERATION
Filed Aug. 3, 1940   3 Sheets-Sheet 1

INVENTORS
Albert R. Thomas
Philip P. Anderson, Jr.
BY
ATTORNEY.

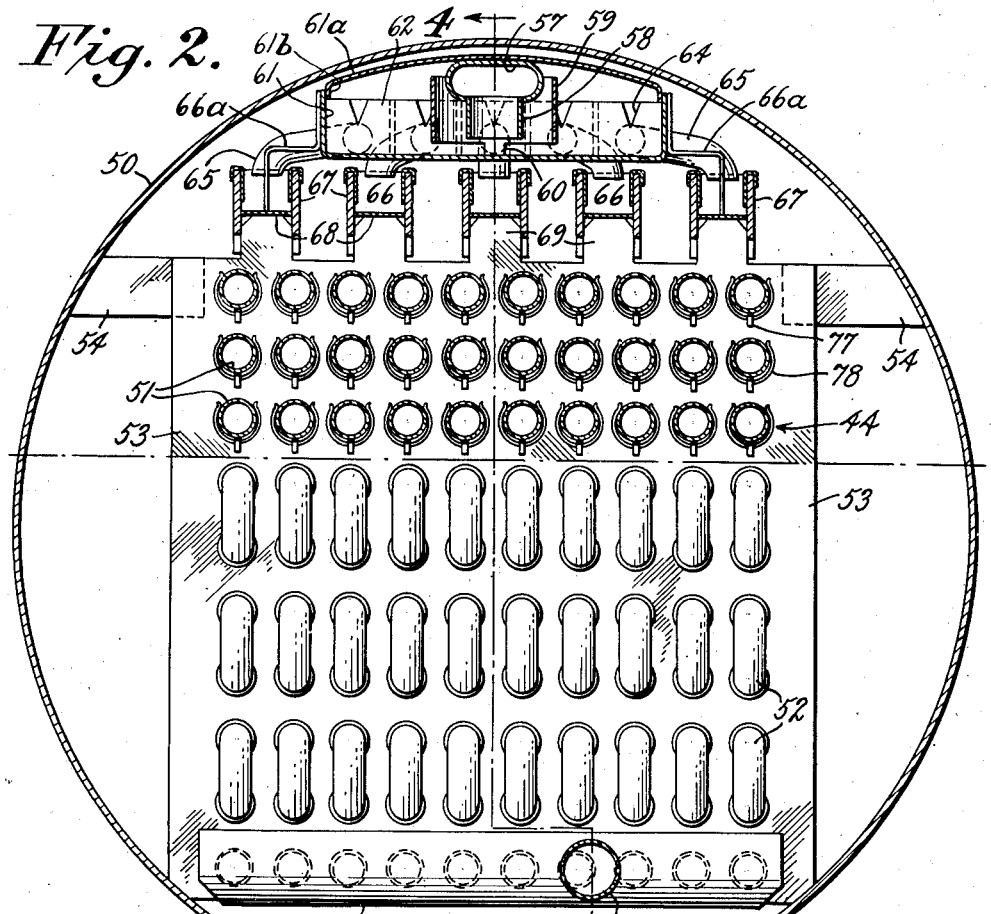
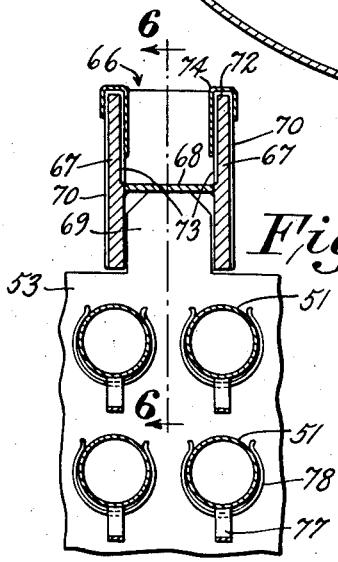
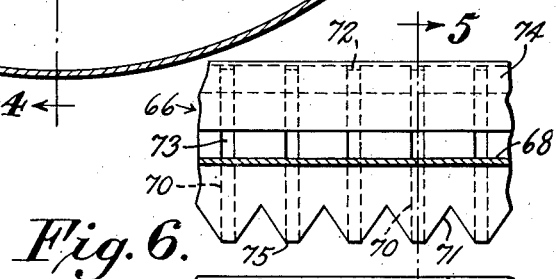
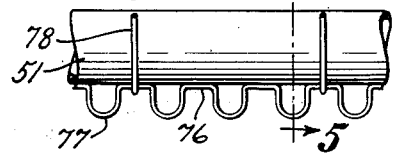

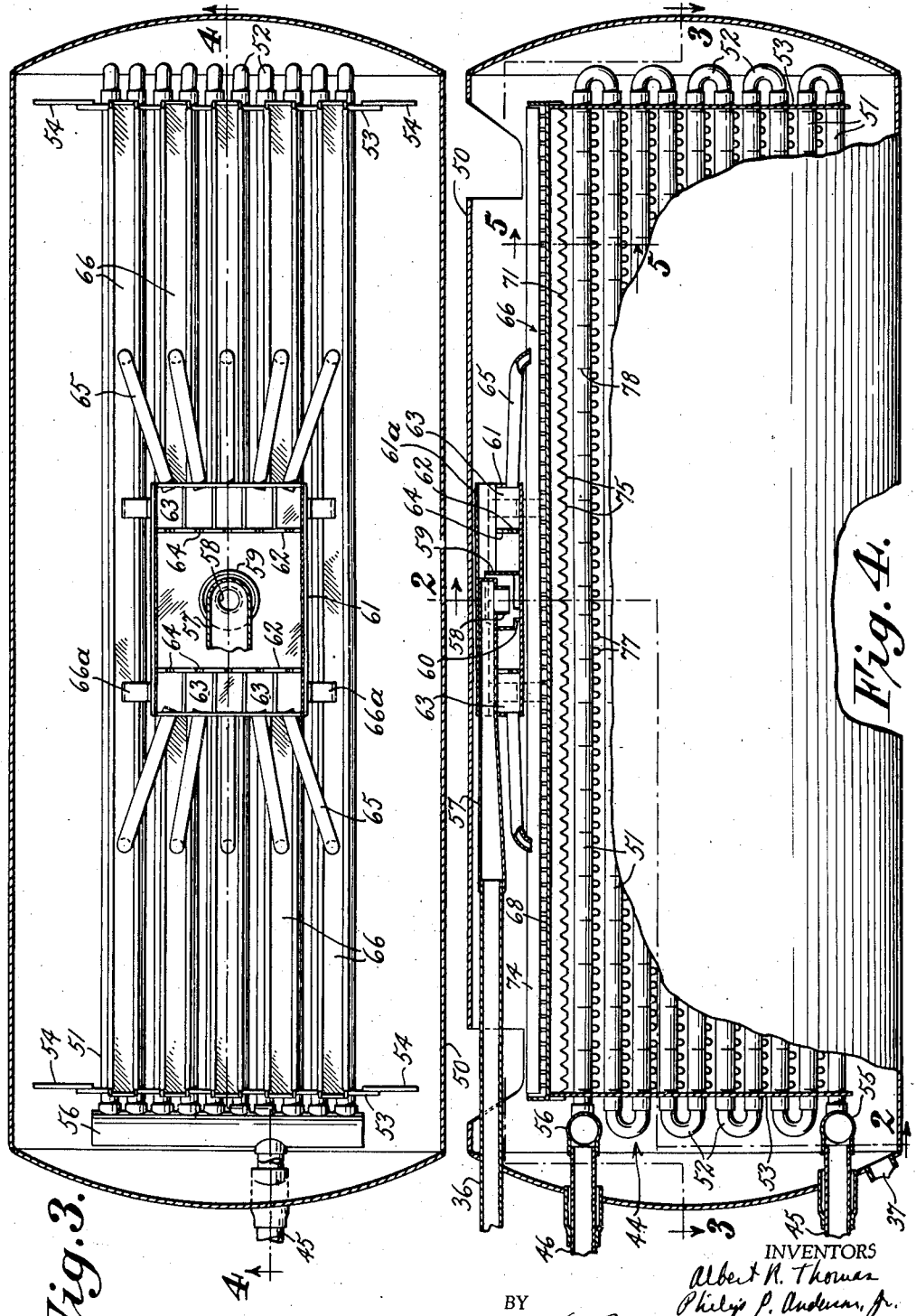

Patented Nov. 10, 1942

2,301,232

UNITED STATES PATENT OFFICE 2,301,232

REFRIGERATION

Albert R. Thomas and Philip P. Anderson, Jr., Evansville, Ind., assignors to Servel, Inc., New York, N. Y., a corporation of Delaware Application August 3, 1940, Serial No. 350,234

17 Claims. (Cl. 62—119)

This invention relates to refrigeration, and more particularly to refrigeration systems of the absorption type operated by heat.

In a refrigeration system of this type, in order to circulate absorption liquid through and between a generator and an absorber without a mechanical device having moving parts, absorption liquid is raised by vapor-lift action in the generator with the raised liquid flowing to the absorber and returning from the absorber to the generator by gravity. When a so-called "film" type of absorber is employed in a refrigeration system in which gravity flow of absorption liquid takes place, that is, an absorber in which a liquid film is caused to form on the surfaces of piping through which a cooling medium flows, only the force of gravity is available to effect spraying and spreading of the absorption liquid over the pipe surfaces. While flowing over the pipe surfaces the absorption liquid absorbs refrigerant vapor passing into the absorber with the resulting heat of absorption being conducted to the cooling medium, such as water, for example, flowing through the piping.

In a "film" type of absorber, it is necessary to provide ample gas and liquid contact surface for the refrigerant vapor and absorption liquid, and for this reason it is desirable to provide sufficient length of piping upon which the film of absorption liquid can be maintained and through which the cooling medium flows. In absorption refrigeration systems of large capacity, increasing the size of the absorber unduly results in a system of increased size, and this is undesirable because of the importance of keeping refrigeration systems as small as possible, so that they will occupy a minimum amount of space. In many instances, particularly in stores and often in dwellings, the amount of space available for the installation of a refrigeration system is limited and a deciding factor in the ultimate selection of a particular type of refrigeration system.

In accordance with this invention, in order to provide a "film" type absorber which is of minimum height for a refrigeration system of a given capacity, so that the system will occupy a minimum amount of space, the piping over which the absorption liquid flows is formed to provide a plurality of vertically disposed pipe banks arranged alongside of each other with each bank having substantially horizontal pipe sections located one above the other. Although only the force of gravity is available to cause spraying and spreading of liquid, with such force being at a minimum because of the short vertical distance through which liquid falls from the point of supply to the uppermost pipe sections, the stream of absorption liquid is subdivided in such a manner that uniform wetting of the pipe sections is effected.

This is accomplished by first subdividing the liquid at the supply point laterally of the pipe banks and then longitudinally of the pipe sections. The liquid is subdivided lengthwise of the pipe sections in such a manner that drops of liquid freely fall by gravity onto the top surfaces of all of the pipe sections. The liquid drops fall in rapid succession from fixed points which may be termed independent horizontal drip surfaces, and these drip surfaces are spaced as close together as possible to insure uniform wetting of the pipe sections over their entire exterior surfaces. In addition, each pipe section is spaced as close as possible to the next lower pipe section without interfering with the uniform wetting of the pipe surfaces effected by the falling drops of liquid. Thus, even though the force available for spreading and spraying of liquid is relatively small, uniform wetting of the pipe surfaces is insured and at the same time the absorber height is kept at a minimum for a refrigeration system of a given capacity.

The invention, together with the objects and advantages thereof, will be more fully understood from the following description and accompanying drawings forming a part of this specification, and of which:

Fig. 2 is an enlarged vertical sectional view, taken on lines 2—2 of Figs. 1 and 4, to illustrate the absorber structure more clearly;

Fig. 3 is a horizontal view of the absorber structure taken on line 3—3 of Fig. 4;

Fig. 4 is a vertical view of the absorber structure, partly in section, taken on lines 4—4 of Figs. 2 and 3;

Figure 1:
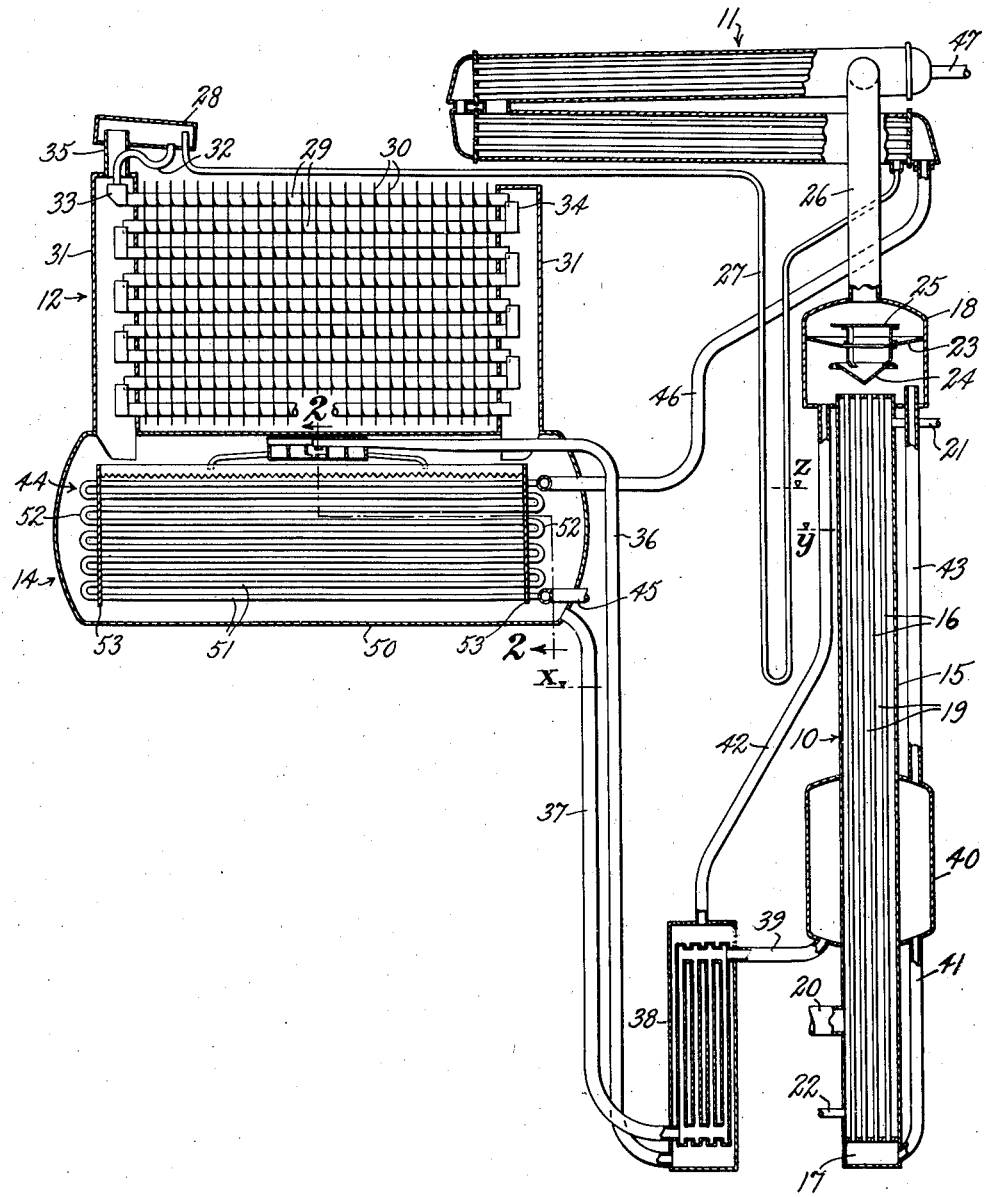
Fig. 1 is a view more or less diagrammatically illustrating an absorption refrigeration system embodying the invention.

Fig. 5 is an enlarged fragmentary sectional view, taken on lines 5—5 of Figs. 4 and 6, to show parts of the absorber structure more clearly; and Fig. 6 is a vertical sectional view taken on line 6—6 of Fig. 5.

Referring to Fig. 1, the present invention is embodied in a two pressure absorption refrigeration system generally like that described in application Serial No. 239,762 of A. R. Thomas and P. P. Anderson, Jr., filed November 10, 1938, now Patent No. 2,282,503, granted May 12, 1942. A system of this type operates at low pressures and includes a generator or expeller 10, a condenser 11, an evaporator 12 and an absorber 14 which are interconnected in such a manner that the pressure differential in the system is maintained by liquid columns.

The disclosure in the aforementioned Thomas and Anderson application may be considered as being incorporated in this application, and, if desired, reference may be made thereto for a detailed description of the refrigeration system. In Fig. 1 the generator 10 includes an outer shell 15 within which are disposed a plurality of vertical riser tubes 16 having the lower ends thereof communicating with a space 17 and the upper ends thereof extending into and above the bottom of a vessel 18. The space 19 within shell 15 and about the tubes 16 forms a steam chamber to which steam is supplied through a conduit 20. The space 19 provides for full length heating of riser tubes 16, and a vent 21 is provided at the upper end of shell 15. A trap conduit 22 is connected to the lower end of shell 15 above space 17 to provide a drain for condensate formed in space 19.

The system operates at a partial vacuum and contains a solution of refrigerant in absorption liquid, such as, for example, a water solution of 40% lithium chloride by weight. With steam being supplied through conduit 20 to space 19 at atmospheric pressure, heat is applied to tubes 16 whereby water vapor is expelled from solution. The absorption solution is raised by gas or vapor-lift action with the expelled water vapor forming a central core within an upwardly rising annulus of the solution. The expelled water vapor rises more rapidly than the solution and the latter follows the inside walls of tubes 16.

The water vapor flows upwardly through the tubes or risers 16 into vessel 18 which is provided with an apertured baffle 23 and deflectors 24 and 25 at each side of the aperture in the baffle. The baffle 23 and deflectors 24 and 25 serve as a vapor separator so that expelled water vapor is separated from raised absorption solution in vessel 18 and flows through conduit 26 into condenser 11. The condensate formed in condenser 11 flows through a U-tube 27 into a flash chamber 28 and from the latter into evaporator 12.

The evaporator 12 and flash chamber 28 are more or less diagrammaticaly shown in Fig. 1 and may be like that described and shown in the aforesaid Thomas and Anderson application or Thomas application Serial No. 350,235, filed August 3, 1940. The evaporator 12 includes a plurality of horizontal banks of tubes 29 disposed above one another and to which are secured heat transfer fins 30 to provide a relatively extensive heat transfer surface. The end portions of the tubes 29 pass into spaced vertical headers 31. The water flows from flash chamber 28 through a trap conduit 32 into a liquid distributing trough 33 from which the water flows into the uppermost horizontal bank of tubes 29. The water passes through successively lower banks of tubes through upright open end sections 34 at the ends of tubes 29, any excess liquid being discharged from the lowermost bank of tubes 29.

The water supplied to tubes 29 evaporates therein to produce a refrigerating or cooling effect with consequent absorption of heat from the surroundings, as from a stream of air flowing over the exterior surfaces of tubes 29 and fins 30. The vapor formed in tubes 29 passes out through the distributing trough 33 and open end sections 34 in headers 31 which are connected at their lower ends to absorber 14.

To prevent disturbances in evaporator 12, the flash chamber 28 is provided to take care of any vapor flashing of liquid being fed to the evaporator through U-tube 27. The flashed vapor which may form passes through a conduit 35 into one of the headers 31 and mixes with vapor formed in evaporator 12.

In absorber 14 refrigerant vapor is absorbed into concentrated absorption solution which enters through a conduit 36, as will be described more fully hereinafter. The water vapor absorbed into solution dilutes the latter, and the diluted absorption solution flows through a conduit 37, a first passage in liquid heat exchanger 38, conduit 39, vessel 40, and conduit 41 into the lower space 17 of generator 10. Water vapor is expelled out of solution in generator 10 by heating and the solution is raised by vapor-lift action in riser tubes 16, as explained above.

The absorption solution in vessel 18 is concentrated since water vapor has been expelled therefrom in generator 10. This concentrated solution flows through a conduit 42, a second passage in liquid heat exchanger 38, and conduit 36 into absorber 14.

The vessel 40 is cylindrical in shape and disposed about shell 15 of generator 10. The heating effect of the steam in space 19 is transmitted through a portion of shell 15 to absorption solution in vessel 40 whereby the absorption solution flowing to the generator through conduit 41 is preheated, as described more fully in Thomas application Serial No. 347,631, filed July 26, 1940. The upper part of vessel 40 is connected by a conduit 43 to vessel 18 so that the pressure in vessel 40 is equalized with the pressure in the upper end of generator 10 and condenser 11.

The heat liberated with absorption of water vapor in absorber 14 is transferred to a cooling medium, such as water, for example, which flows upward through vertically disposed piping 44. The cooling medium is suplied to the lower end of piping 44 through a conduit 45 and the upper end of the piping is connected by a conduit 46 to condenser 11, so that the same cooling medium may be utilized to cool absorber 14 and condenser 11. The cooling medium may flow from condenser 11 through conduit 47 to waste.

The system operates at a low pressure with the generator 10 and condenser 11 operating at one pressure and the evaporator 12 and absorber 14 operating at a lower pressure, the pressure differential therebetween being maintained by liquid columns. Thus, the liquid column formed in tube 27 maintains the pressure differential between condenser 11 and evaporator 12, the liquid column in conduit 37 maintains the pressure differential between the outlet of absorber 14 and generator 10, and the liquid column formed in conduit 36 and connected parts including conduit 42 maintains the pressure differential between the inlet to absorber 14 and generator 10. In operation, the liquid columns may form in conduits 37 and 42 and the down-leg of tube 27 to the levels $x$, $y$ and $z$, for example. The conduits are of such size that restriction to gas flow is effected without appreciably restricting flow of liquid.

The liquid column formed in vessel 40 and conduit 41 provides the liquid reaction head for raising liquid in riser tubes 16 by vapor-lift action. The vessel 40 is of sufficient volume to hold the liquid differential in the system and is of such cross-sectional area that the liquid level therein does not appreciably vary, so that a substantially constant reaction head is provided for lifting liquid in generator 10. The vessel 40 is located below absorber 14 such a distance that, for the greatest pressure differential occurring between absorber 14 and the upper part of generator 10 during operation of the system, the liquid column formed in conduit 37 is below the lower part of absorber 14.

In refrigeration system just described, circulation of absorption liquid is effected through and between generator 10 and absorber 14 without a mechanical device, such as a mechanical pump, for example. For this reason the generator is so constructed that absorption solution is raised by vapor-lift action whereby the raised solution can flow by gravity from vessel 18 into absorber 14. When operation of the refrigeration system is first started, both passages of liquid heat exchanger 38, conduit 39, a part of vessel 40, and conduit 41 are filled with absorption solution. Liquid raised by vapor-lift action spills over from the upper ends of riser tubes 16 into conduit 42 to form liquid columns in conduits 36 and 42.

The conduit 42 extends above the upper end of conduit 36 in order that flow of absorption solution will take place to absorber 14 independently of the pressure differential in the system. After the pressure differential in the system has built up and the liquid column in conduit 42 is of less height than the liquid column in conduit 36 due to the higher pressure in generator 10 than in absorber 14, absorption solution still continues to flow by gravity from the upper part of conduit 42 to absorber 14 with the liquid column formed in conduit 42 and connecting parts serving to maintain the pressure differential between the inlet to the absorber and the upper part of the generator. Absorption solution flows from the bottom of absorber 14 to generator 10 through conduit 37 and connecting parts by gravity with the liquid column therein serving to maintain the pressure differential between the outlet of absorber 14 and the upper part of generator 10.

In accordance with this invention, absorber 14 includes an outer cylindrical shell 50 to which is secured the lower ends of evaporator headers 31 so that vapor formed in evaporator 12 will pass through the headers into the shell 50. Within shell 50 is the piping 44 formed to provide a plurality of vertically disposed pipe banks arranged alongside of each other, as shown most clearly in Fig. 2. Each pipe bank includes a plurality of substantially horizontal pipe sections 51 located one above the other with connecting bends 52 at their ends, as shown most clearly in Fig. 4. The ends of pipe sections 51 pass through openings in end plates 53 with the pipe sections being secured to the end plates at the openings, as by welding or brazing, for example. As shown most clearly in Fig. 2, the diagonally cut bottom corners of the end plates 53 rest against the upwardly sloping parts of the shell 50 and are secured to the latter, as by welding or brazing, for example. The top corners of the end plates 53 are secured by brackets 54 to the inside upper parts of shell 50 to provide a rigid support for piping 44 within the shell.

The ends of the lowermost pipe sections 51 are connected to a horizontally disposed manifold 55, as shown in Figs. 2, 3 and 4. Likewise, the uppermost straight pipe sections 51 are connected to an upper horizontally disposed manifold 56. The conduits 45 and 46 through which cooling medium enters and leaves piping 44 pass through openings in an end head of shell 50 and are connected to the manifolds 55 and 56, respectively. The cooling medium entering through conduit 45 is distributed in manifold 55 with a portion of the cooling medium flowing upwardly through each pipe bank of piping 44. The individual streams of cooling medium flowing upwardly through the pipe banks come together in upper manifold 56 and the cooling medium then flows through conduit 46 to condenser 11 for cooling the latter, as explained above.

The conduit 36 through which concentrated absorption liquid is introduced into absorber 14 passes through an opening in the upper part of shell 50. To the end of conduit 36 is secured a pipe section 57 having a tapering portion through which liquid first flows and then a flattened or elliptical portion which terminates substantially at the center of shell 50. The elliptical portion of pipe 57 is closed at its end and adjacent to the end is provided with an opening at its bottom side to which is secured a short tubular member 58. A large tubular member 59 is disposed about tubular member 58 with the elliptical-shaped portion of pipe 57 passing through a cutout part at the upper edge thereof, as shown most clearly in Fig. 4.

The tubular member 59 is formed with short legs 60 which are supported by the bottom of a liquid receptacle or weir box 61. Absorption liquid flowing through conduit 36 and pipe 57 passes through tubular member 58 into the weir box 61. The weir box 61 is provided with lateral or transverse walls 62 at each end thereof to provide smaller compartments or weir sections 63, and the walls 62 are formed with V-shaped notches 64 at their upper edges, so that absorption liquid flows from the larger center compartment through the notches into the smaller compartments 63. From the smaller compartments 63 absorption liquid passes through a plurality of pipes 65 having the outer ends thereof disposed above troughs 66 which serve as liquid holders and distributors and are located alongside of each other and extend lengthwise of the shell 50. As shown most clearly in Fig. 3, there are as many troughs 66 as there are compartments 63 extending transversely of weir box 61, and the pipes 65 leading from directly opposite compartments 63 at each end of weir box 61 supply absorption liquid to the same trough 66 at regions spaced from each other.

As shown most clearly in Fig. 2, the weir box 61 is provided with a cover 61a which is curved and provided with flanges 61b which fit inside the longitudinal side walls of the weir box. The cover 61a may be secured, as by welding, for example, to the side walls of the weir box.

The weir box 61 is supported by the outermost troughs 66, as best seen in Fig. 2. This is accomplished by providing a plurality of clips 66a which are secured at their upper ends to the sides of the weir box. A clip 66a is provided adjacent each corner of the weir box, and the lower parts thereof extend into and rest at the bottoms of the outermost troughs 66. To maintain the weir box 61 in fixed position, the clips 66a are preferably secured, as by welding, for example, to the trough bottoms.

Referring more particularly to Figs. 2, 5 and 6, the troughs 66 are formed by the top half of H-shaped members which include spaced vertical side walls 67 and a horizontal cross wall 68. The H-shaped members forming troughs 66 are supported at their ends by the end plates 58 which are formed with spaced tabs 69 at their top edges. The tabs 69 receive the bottom parts of the H-shaped members with the horizontal walls 68 resting directly against the upper edges of the tabs. The lower edges of side walls 67 and underside of horizontal walls 68 are secured to the tabs 69, as by welding or brazing, for example.

As shown most clearly in Figs. 2 and 5, the vertically disposed pipe banks are located beneath the side walls 67 of troughs 66. In order to obtain longitudinal sub-division of the liquid after the lateral sub-division thereof in weir box 61, an arrangement is provided to effect siphoning of liquid from the troughs 66 onto the uppermost pipe sections 51 of pipe coils 44. This is accomplished by forming slots, as by milling, for example, at the side walls 67 of trough 66. The outer surface of each side wall 67 is provided with vertical slots 70 which extend from the top to the bottom edge of the side wall, as shown in Figs. 5 and 6. The lower edge of each side wall 67 is notched at 71 with the slots 70 disposed between the inclined side edges of adjacent notches. The top edges of the side walls 67 are also slotted at 72 with these slots being in alignment with slots 70. The inner surfaces of side walls 67 are also formed with slots 73 which extend downwardly from the top cross slots 72 for a distance substantially equal to the depth of the troughs 66, as shown most clearly in Fig. 5.

The slots 70, 72 and 73 are covered by inverted U-shaped plates 74 which are formed from relatively thin sheet metal. The cover plates 74 fit tightly over the top edges of side walls 67 for the full length of the latter and extend downward a greater distance on the inside than on the outside of the side walls. The slots 70, 72 and 73 are relatively shallow so that flow of liquid through the passages formed by the slots and cover plates 74 is effected by capillary siphon action. The distance that the longer sides of cover plates 74 extend into troughs 66 determines the height to which the liquid level must rise in the troughs before siphoning first starts by capillary action. That is, with a given height of the longer side walls of cover plate 74, the liquid must rise to a definite level in troughs 66 for liquid in slots 73 to rise by capillary action in fixed paths of flow to the top edges of side walls 67; and, when the liquid level in the troughs reaches this definite level to effect such rise of liquid in slot 73 by capillary action to the cross slots 72, siphoning of liquid from the troughs takes place. After siphoning action has once been started, siphoning of liquid continues as long as the liquid level in the troughs is at or above the lower ends of the longer sides of cover plates 74. If the siphon action is broken, the liquid in troughs 66 must again rise to the definite level sufficient to cause capillary rise of liquid in slots 73 to the height of the cross slots 72.

The liquid siphoned from trough 66 flows down the outer slots 70 with a downwardly flowing film of liquid being formed at the outer surfaces of the side walls 67. By notching the lower edges of the side walls to form teeth 75, the liquid at the outer surfaces of the side walls is caused to flow toward a number of spaced points at which drops of liquid are formed. The drops of liquid formed at the teeth 75 fall therefrom in rapid succession onto the top surface of the uppermost pipe sections 51 of the pipe banks. Each tooth 75 at the lower edges of the side walls 67 serves as an independent horizontal drip surface, the teeth being as close together as possible but spaced sufficiently far apart so that lateral bridging of the teeth with liquid is prevented. By causing the drops of liquid to form as close together as possible, uniform wetting of the outer surfaces of the uppermost pipe sections 51 is readily effected. With such uniform wetting of the uppermost pipe sections, a thin film of liquid is constantly maintained over their entire surfaces. The uppermost pipe sections 51 are as close as possible to the trough side walls 67 and spaced from the lower edge of teeth 75 a vertical distance substantially the diameter of a drop of liquid.

To the bottom surface portions of all of the pipe sections 51, except the lowermost pipe sections, are secured metal strips 76 having spaced U-shaped loops 77. The strips 76 are removably secured to the pipe sections 51 by spring clips 78, as shown in Figs. 5 and 6. With the strips 76 secured in position against the extreme bottom portions of the pipe sections, the U-shaped loops 77 form eyelets or teeth and serve as points at which drops of liquid are formed from the downwardly flowing film of liquid maintained at the exterior surfaces of the pipe sections. When the drops of liquid formed in the loops 77 become sufficiently heavy to overcome the surface tension at the loops and bottom surface portions of the pipe sections 51, the drops of liquid fall onto the top surface portions of the succeeding lower pipe sections. The loops or drop formers 77 are as close together as possible and yet spaced apart a distance sufficient to prevent lateral bridging of the loops with liquid. The loops 77 also serve as independent horizontal drip surfaces therefor, and are spaced from the top surface portions of the pipe sections 51 directly beneath the loops a vertical distance substantially the diameter of a drop of liquid.

During operation of the refrigeration system, concentrated absorption liquid flows into weir box 61 through tubular member 58 and into the large center compartment through the spaces between the bottom of the weir box and the lower edges of tubular member 59. The tubular member 59 serves the purpose of quieting the liquid flowing into the weir box 61, so that uniform lateral distribution of liquid is effected through notches 64 into the smaller compartments 63. The liquid flows from the compartments 63 through pipes 65 into the troughs 66, two of the pipes 65 supplying liquid to each of the troughs 66. Siphoning of liquid from the troughs 66 takes place in the manner described above, whereby drops of liquid fall in rapid succession from the teeth 75 at the lower edges of the trough side walls 67. Likewise, drops of liquid fall in rapid succession from the loops 77 of each pipe section 51, so that the entire exterior surfaces of all the pipe sections are constantly wetted with a film of liquid.

While flowing over the exterior surfaces of the pipe section 51 the liquid absorbs the evaporated water passing into shell 50 from the evaporator 12 through the headers 31. The heat of absorption resulting from absorption of water vapor by the absorption solution is given up to the cooling medium flowing within the pipe sections 51. The diluted solution flows out from the bottom of shell 50 into conduit 37 in which the liquid stands to a height, such as x, for example, which is dependent on the prevailing pressure differential between the absorber 14 and the generator 10.

Under average operating conditions, the cover 61a is not required for the weir box 61. However, under certain conditions the liquid entering weir box 61 may be above the boiling temperature for the pressure existing therein to cause vapor flashing in the weir box. This may occur, for example, when the temperature of the cooling medium or the rate of flow thereof changes rapidly. Under such conditions, the cover 61a prevents undue loss of liquid when vapor flashing does occur and there is a tendency for liquid to be blown out of the weir box.

The weir box 61 preferably is as level as possible in order that uniform dividing of liquid is effected into the several smaller compartments 63. By supplying liquid to each trough 66 from two compartments 63 directly opposite each other, any tendency for liquid to flow at a greater rate to one group of compartments 63 than to the other group will not affect the uniform distribution of liquid. This may occur, for example, when the liquid level in the center larger compartment of the weir box 61 is just at the apex of the notches 63 and the weir box is not perfectly level. However, with the weirs or notches 64 confined within a limited distance from the central feed point of the liquid, that is, the tubular member 58, lateral distribution of liquid with weirs is feasible despite imperfect leveling of the weir box 61. On the other hand, the siphoning of liquid in such a manner that closely spaced liquid drops are formed is more practical at great longitudinal distances from the feed point of liquid. For this reason, siphon distribution of the liquid is effected longitudinally of shell 50 after the lateral distribution of liquid in weir box 61. With this arrangement, the further sub-dividing of the liquid in the troughs 66 is less dependent upon perfect leveling. While other arrangements for sub-dividing liquid to form liquid films on the surfaces of pipe coils will not function properly if the pipe sections are sloping, the absorber structure shown and described above will work properly to cause drops of liquid to fall onto the top surface portions of the pipe sections even when the troughs 66 and pipe sections 51 are not perfectly level.

By spacing the uppermost pipe sections 51 from the lower edges of teeth 75 and also spacing the loops or drop formers 77 from the top surface portions of the pipe sections substantially the diameter of a drop of liquid, a maximum area of liquid film surface is provided in a minimum amount of space. During operation of the absorber 14, drops of liquid fall in rapid succession along the entire lengths of the trough side walls 67 and the pipe sections 51. Hence, there is no tendency for the liquid drops to run together to produce distinct individual streams of liquid at localized areas, so that only a portion of the pipe surfaces is maintained in a wetted condition. By insuring that liquid drops are formed at the lower edges of the trough side walls 67 and at the bottoms of the pipe sections 51, a condition is established which simulates a rainfall with drops of liquid always falling onto the top surfaces of all of the pipe sections 51 including those at the lowermost part of the absorber structure. Thus, even though the only force available to cause spreading and spraying of absorption solution in absorber 14 is gravity, which is at a minimum because of the short vertical distance through which solution passes from pipe section 57 to the uppermost pipe sections 51, the liquid is effectively sub-divided to uniformly wet all of the exterior surfaces of the pipe sections 51.

To insure the formation of a film of liquid over the entire surfaces of the pipe sections 51, all grease and oxides are removed from the exterior surfaces thereof to provide clean surfaces. When the pipe sections 51 are formed of copper tubing, for example, the pipe sections are dipped in a bath of nitric acid. This is referred to as bright dipping and the clean and bright surfaces resulting from such dipping insure a uniform film of liquid being formed and maintained at all times at the exterior surfaces of the pipe sections.

While a single embodiment of the invention has been shown and described, it will be apparent that modifications and changes may be made without departing from the spirit and scope of the invention, as pointed out in the following claims.

What is claimed is:

1. Absorption refrigeration apparatus including a generator, a condenser, an evaporator and an absorber, members connecting the aforementioned parts for circulation of refrigerant and absorption liquid, a liquid lift for raising absorption liquid by vapor-lift action so that liquid is introduced into said absorber by gravity action, said absorber including banks of pipes disposed alongside of each other with each bank having substantially horizontal and level pipe sections located one above the other, and structure to first sub-divide the absorption liquid conducted to said absorber laterally of said pipe banks and then lengthwise of said pipe sections, so that drops of liquid descend by gravity from one pipe section to another and over the exterior surfaces of said pipe sections, said structure being so constructed and arranged that any tendency for the drops of liquid to produce distinct individual streams at localized areas is avoided whereby a rainfall is simulated with the drops of liquid always falling onto the top surfaces of all of the pipe sections including those at the lowermost part of said absorber.

2. Refrigeration apparatus of the absorption type including structure for effecting gas and liquid contact comprising piping having sections thereof disposed substantially horizontally one above the other, a plurality of independent horizontal drip surfaces on said pipe sections, and means for delivering liquid upon said piping so that liquid descends by gravity from one section to another, said independent horizontal drip surfaces serving as fixed points from which drops of liquid fall and being spaced apart such a distance that the drops of liquid fall onto the next lower pipe section and immediately merge thereon, whereby liquid is caused to flow over the exterior surfaces of the piping to completely wet the pipe sections.

3. Absorption refrigeration apparatus including a generator for expelling refrigerant from absorption liquid, a condenser for liquefying the expelled refrigerant, an evaporator for evaporating the liquid refrigerant, and an absorber connected to receive evaporated refrigerant and having an inlet and an outlet for absorption liquid, said absorber comprising a plurality of vertically disposed pipe banks arranged alongside of each other with each bank having horizontally disposed and level pipe sections located one above the other, and structure for spreading and spraying absorption liquid by gravity action to completely wet all of the exterior surfaces of said pipe sections, said structure including means to first sub-divide absorption liquid laterally of said pipe sections and then lengthwise of said pipe sections in such a manner that drops of liquid freely fall by gravity from fixed points onto the top surfaces of said pipe sections with the drops of liquid being formed at regions relatively close to each other without bridging of the drops of liquid, so that drops of liquid immediately merge on the top surfaces of said pipe sections to cause complete wetting of the exterior surfaces of said pipe banks.

4. Refrigeration apparatus of the absorption type including structure for effecting gas and liquid contact comprising a plurality of vertically disposed pipe banks arranged alongside of each other with each bank having substantially horizontal and level pipe sections located one above the other, means for supplying liquid to a point above said pipe banks, and means for spreading liquid from said supply point by gravity action to completely wet the exterior surfaces of all of said pipe sections with a film of liquid, said liquid spreading means including means to first sub-divide the liquid at the supply point laterally of said pipe banks and then lengthwise of said pipe sections in such a manner that drops of liquid freely fall by gravity onto the top surface of each pipe section with the drops of liquid being formed at fixed regions relatively close to each other without bridging of the drops of liquid, and each pipe section being vertically spaced from the drop-forming regions of the pipe section above it substantially the diameter of a drop of liqiud, so that drops of liquid immediately merge on the top surfaces of said pipe sections to cause complete wetting of the exterior surfaces of said pipe banks.

5. Refrigeration apparatus of the absorption type including structure for effecting gas and liquid contact comprising piping having substantially horizontal pipe sections disposed one above the other, means to supply liquid to a region above the uppermost pipe section, and means for distributing the liquid onto said pipe sections so that their exterior surfaces are maintained in a wetted state by a film of liquid with drops of liquid falling freely by gravity from fixed points at the bottom side of each pipe section onto the top side of the succeeding lower pipe section, said distributing means being so constructed and arranged that any tendency for the liquid drops to produce distinct individual streams at localized areas is avoided, whereby a rainfall is simulated with the drops of liquid always falling onto the top surfaces of all of the pipe sections including those at the lowermost part of said piping.

6. In an absorption refrigeration system of the kind in which absorption liquid from which refrigerant has been expelled from solution flows to an absorber in which evaporated refrigerant is absorbed into solution, the improvement which consists in flowing absorption liquid in free falling condition in the presence of evaporated refrigerant with drops of liquid falling in rapid succession in a path from a number of closely spaced fixed points to simulate a rainfall, obstructing the free fall of liquid drops in said path a number of times with the drops of liquid merging immediately upon contacting an obstruction, flowing liquid from each obstruction with drops of liquid falling in rapid succession from a number of closely spaced fixed points to simulate a rainfall between obstructions, and cooling the obstructing medium.

7. Absorption refrigeration apparatus comprising an absorber for effecting gas and liquid contact, said absorber including a plurality of vertically disposed pipe banks alongside of each other with each bank having substantially horizontal pipe sections located one above the other, a plurality of liquid holders and distributors having independent horizontal drip surfaces vertically spaced from the uppermost pipe sections substantially the diameter of a drop of liquid, a plurality of independent horizontal drip surfaces on said pipe sections vertically spaced from the pipe sections therebelow a distance substantially the diameter of a drop of liquid, structure including a receptacle above said holders to receive liquid entering said absorber and to divide the liquid between said holders, whereby liquid is first sub-divided laterally of said pipe banks and then lengthwise of said pipe sections so that drops of liquid descend by gravity from said independent horizontal drip surfaces of said liquid holders and of said pipe sections from one pipe section to another and immediately merge on the top of surfaces of said pipe sections to completely wet the exterior surfaces of said pipe banks.

8. Absorption refrigeration apparatus comprising an absorber for effecting gas and liquid contact, said absorber including a plurality of vertically disposed pipe banks alongside of each other with each bank having substantially horizontal pipe sections located one above the other, a separate liquid holder and spreader above the uppermost pipe sections of each pair of banks for equalizing distribution of liquid thereon, a liquid receptacle above said liquid holders connected to receive absorption solution, two groups of chambers at spaced apart regions, and means for effecting distribution of liquid from said receptacle to said chambers and from a chamber in each of said groups conducting liquid to one of said liquid holders.

9. Refrigeration apparatus including an absorber for effecting contact between evaporated refrigerant and absorption solution, said absorber comprising a plurality of vertically disposed pipe banks arranged alongside of each other with each pipe bank having substantially horizontal pipe sections one located above the other, said pipe sections having a plurality of independent horizontal drip surfaces serving as fixed points from which drops of liquid fall, liquid holders and distributors above the uppermost pipe sections having a plurality of independent horizontal drip surfaces serving as fixed points from which drops of liquid fall, a liquid receptacle and distributor above said liquid holders from which liquid is distributed to said liquid holders, means to conduct absorption liquid to said liquid receptacle, and means to conduct liquid dripping from the lowermost pipe sections, said independent horizontal drip surfaces being spaced apart such a distance that bridging of liquid therebetween is avoided and yet sufficiently close together to that drop of liquid falling therefrom immediately merge on the top surfaces of said pipe sections to cause complete wetting of the exterior surfaces of said pipe banks.

10. Refrigeration apparatus including an absorber for effecting gas and liquid contact, said absorber comprising a plurality of vertically disposed pipe banks arranged alongside of each other with each bank having horizontally disposed pipe sections located one above the other, a liquid receptacle above said pipe banks arranged to receive absorption liquid from a feed point connected to the inlet, two groups of chambers, liquid holders disposed at a lower level than said liquid receptacle and above said pipe banks, means to effect distribution of liquid from said receptacle to said two groups of chambers and thence to said liquid holders, the distribution of liquid to said chambers laterally of said pipe banks being effected at regions relatively close to the liquid feed point compared to the lengths of said pipe sections so that any tendency for liquid to flow at a greater rate to one group of chambers than to the other will not affect distribution of liquid, means to distribute liquid lengthwise of said holders onto the uppermost pipe sections of said pipe banks, and liquid drop formers at the bottom surfaces of said pipe sections to cause drops of liquid to form and fall freely by gravity onto the top surfaces of said pipe sections.

11. Refrigeration apparatus comprising structure to sub-divide liquid including a substantially horizontal liquid holder having a side wall provided with independent horizontal drip surfaces, means to deliver liquid to said holder, and means to siphon liquid from said holder onto said side wall so that drops of liquid fall in rapid succession by gravity from said horizontal drip surfaces.

12. Refrigeration apparatus comprising structure to sub-divide liquid including a substantially horizontal liquid holder having a side wall notched at its lower edge to form spaced teeth serving as independent horizontal drip surfaces, means to deliver liquid to said holder, and means to siphon liquid from said holder onto said side wall so that drops of liquid fall in rapid succession from said teeth by gravity.

13. Refrigeration apparatus comprising structure to sub-divide liquid including a substantially horizontal liquid holder having a side wall provided with independent horizontal drip surfaces at its lower edge, means to deliver liquid to said holder, and means to siphon liquid from said holder onto said side wall including slots formed in the latter and a cover for said slots to form capillary siphon passages, whereby drops of liquid fall in rapid succession by gravity from said horizontal drip surfaces.

14. Refrigeration apparatus comprising liquid distributing structure including a liquid holder arranged to receive liquid and having a side wall, and means to form a plurality of siphon passages in said side wall to cause liquid to siphon from the inside of said holder and flow downwardly at the outside of said side wall.

15. Refrigeration apparatus comprising liquid distributing structure comprising a liquid holder arranged to receive liquid and having a side wall, means including vertically extending shallow slots opposite each other at the inside and outside of said wall and an inverted U-shaped cover to close off said slots to form siphon passages whereby liquid flows upwardly from within said holder at the inside of said wall and downwardly at the outside of said wall.

16. Refrigeration apparatus comprising structure for distributing liquid including a liquid holder arranged to receive liquid and having a side wall, an inverted U-shaped cover adapted to fit over said side wall, said side wall and said cover being so constructed and arranged that a plurality of capillary siphon passages are formed along said side wall to cause liquid to flow upwardly in fixed paths of flow from within said holder at the inside of said wall and downwardly at the outside of said wall.

17. Refrigeration apparatus comprising structure for distributing liquid including a liquid holder arranged to receive liquid and having a side wall, an inverted U-shaped cover adapted to fit over said side wall, said side wall and said cover being so constructed and arranged to provide independent horizontal drip surfaces and a plurality of capillary siphon passages to cause liquid to flow upwardly in fixed paths of flow from within said holder at the inside of and along said wall and downwardly at the outside of said wall to said independent drip surfaces at which regions drops of liquid fall in rapid succession by gravity.

ALBERT R. THOMAS.
PHILIP P. ANDERSON, Jr.